United States Patent
Viennot et al.

(10) Patent No.: US 9,660,501 B2
(45) Date of Patent: May 23, 2017

(54) ELECTRIC ACTUATOR WITH A MANUAL DRIVE MEANS

(71) Applicant: SAGEM DEFENSE SECURITE, Boulogne, Billancourt (FR)

(72) Inventors: Severi Viennot, Boulogne Billancourt (FR); Thierry Cartry, Boulogne Billancourt (FR); Mickael Werquin, Boulogne Billancourt (FR); Louis Chavignier, Boulogne Billancourt (FR)

(73) Assignee: SAGEM DEFENSE SECURITE, Boulogne, Billancourt (FR)

( * ) Notice: Subject to any disclaimer, the term of this patent is extended or adjusted under 35 U.S.C. 154(b) by 0 days.

(21) Appl. No.: 15/101,105

(22) PCT Filed: Sep. 19, 2014

(86) PCT No.: PCT/EP2014/070012
§ 371 (c)(1),
(2) Date: Jun. 2, 2016

(87) PCT Pub. No.: WO2015/082090
PCT Pub. Date: Jun. 11, 2015

(65) Prior Publication Data
US 2016/0308422 A1    Oct. 20, 2016

Related U.S. Application Data

(60) Provisional application No. 61/912,267, filed on Dec. 5, 2013.

(51) Int. Cl.
*H02K 7/14*    (2006.01)
*H02K 5/22*    (2006.01)
(Continued)

(52) U.S. Cl.
CPC ............. *H02K 7/145* (2013.01); *B64C 13/42* (2013.01); *B64C 13/44* (2013.01); *B64C 13/50* (2013.01);
(Continued)

(58) Field of Classification Search
CPC .......... H02K 7/06; H02K 7/116; F16D 21/06; F16D 27/10; F16K 31/05; F16K 31/53;
(Continued)

(56) References Cited

U.S. PATENT DOCUMENTS 3,038,352 A    6/1962  Murphy
4,125,790 A    11/1978  Stratienko
(Continued)

FOREIGN PATENT DOCUMENTS

CN    102868253    1/2013
JP    H 10213253    8/1998

*Primary Examiner* — Tran Nguyen
(74) *Attorney, Agent, or Firm* — Muncy, Geissler, Olds & Lowe, P.C.

(57) ABSTRACT

An actuator including a frame, an electric motor fastened to the frame and to a rotor that is constrained to rotate with an outlet shaft, and a connector electrically connected to the motor and secured to the frame to be connected to a complementary connector. The actuator includes a secondary drive device having a secondary shaft having a first end that extends outside the frame and is arranged to be coupled to rotate with a rotary drive tool, a second end of the secondary shaft in rotation coupled with the outlet shaft, and an activation rod opening out into the connector is secured to the frame and arranged to prevent the secondary shaft from being coupled in rotation with the outlet shaft only when the complementary connector is connected to the connector secured to the frame.

5 Claims, 4 Drawing Sheets

(51) Int. Cl.
  *H02K 7/00* (2006.01)
  *H02K 7/10* (2006.01)
  *H02K 7/116* (2006.01)
  *B64C 13/42* (2006.01)
  *B64C 13/44* (2006.01)
  *B64C 13/50* (2006.01)
  *H02K 7/108* (2006.01)

(52) U.S. Cl.
  CPC ............... *H02K 5/225* (2013.01); *H02K 7/00* (2013.01); *H02K 7/10* (2013.01); *H02K 7/108* (2013.01); *H02K 7/116* (2013.01); *H02K 7/14* (2013.01); *H02K 2213/06* (2013.01); *H02K 2213/09* (2013.01)

(58) Field of Classification Search
  CPC . F16H 3/22; F16H 25/20; B64C 13/00; B64C 13/24; F02K 1/09; F02K 1/72; F02K 1/763; F02K 1/766
  USPC .......................... 310/75 D, 75 R, 76, 77, 83
  See application file for complete search history.

(56) References Cited

U.S. PATENT DOCUMENTS

| | | | | |
|---|---|---|---|---|
| 4,563,908 | A * | 1/1986 | Shube | F16H 25/20 |
| | | | | 185/40 R |
| 4,582,183 | A * | 4/1986 | Kuroda | B60T 17/22 |
| | | | | 192/143 |
| 6,612,957 | B2 * | 9/2003 | Bansbach | B60K 17/3462 |
| | | | | 475/204 |
| 6,768,234 | B2 * | 7/2004 | Aoki | F16K 31/041 |
| | | | | 310/50 |
| 2002/0142878 | A1 * | 10/2002 | Bansbach | B60K 17/3462 |
| | | | | 475/204 |
| 2007/0034459 | A1 * | 2/2007 | Matsushita | B60T 13/74 |
| | | | | 188/72.6 |
| 2013/0015381 | A1 | 1/2013 | Husick | |

* cited by examiner

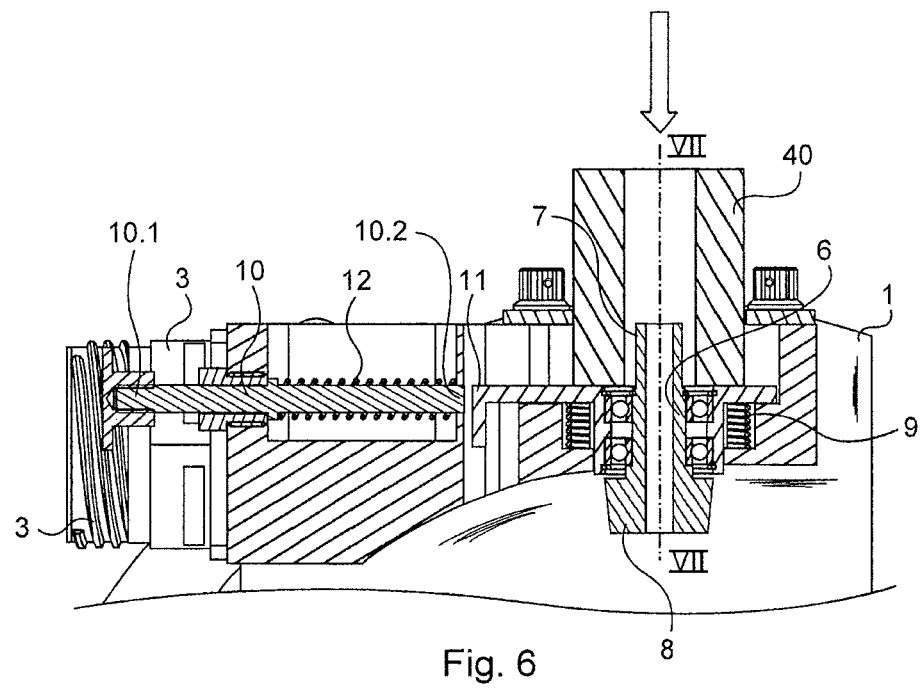
Fig. 6
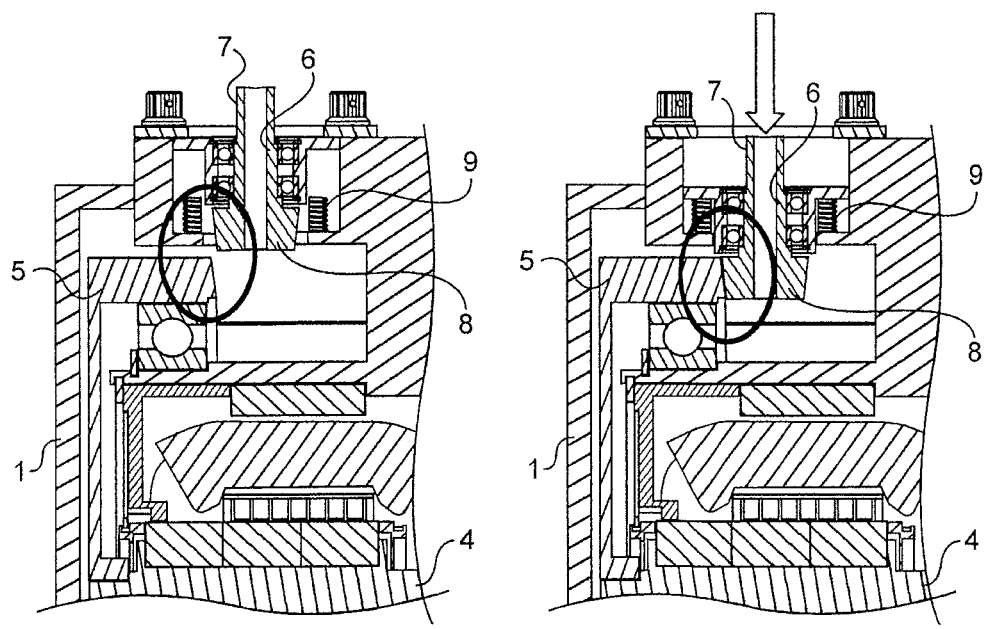
Fig. 5
Fig. 7

ELECTRIC ACTUATOR WITH A MANUAL DRIVE MEANS

BACKGROUND OF THE INVENTION

Field of the Invention

The invention relates to providing motor drive for an element that is movable relative to a stationary structure. The invention relates in particular to actuators for providing motor drive for a movable flight control surface of an aircraft, such as a rudder, an aileron, an elevon, a flap, . . .

Brief Description of the Related Art

An aircraft has flight control surfaces, such as flaps, that are movable between a deployed position and a retracted position, and that are moved between their two positions by actuators. Initially such actuators were purely mechanical, before being replaced by hydraulic actuators. In more recent aircraft, hydraulic actuators are now being replaced more and more by electrical actuators.

Such an electrical actuator comprises a housing containing an electric motor that is provided with means for connecting it to an electrical power supply of the aircraft and that possesses an outlet shaft that engages with the flight control surface via a movement transmission device such as a screw-and-nut device.

For certain maintenance operations while the aircraft is on the ground, it must be possible to move the flight control surfaces. It is then necessary to power the actuator and to control it in order to perform the desired movement. That complicates maintenance procedures, in particular for reasons of ensuring personnel safety.

SUMMARY OF THE INVENTION

An object of the invention is to propose means for facilitating actuation of a movable element that is normally motor driven, other than during a normal mode of operation of said movable element. In an application to an aircraft, the invention seeks to make it easier to actuate movable flight control surfaces during maintenance operations.

To this end, the invention provides an actuator comprising a frame, an electric motor that is fastened to the frame and to a rotor that is constrained to rotate with an outlet shaft, and a connector that is electrically connected to the motor and that is secured to the frame in order to be connected to a complementary connector. The actuator includes a secondary drive device comprising:

- a secondary shaft having a first end that extends outside the frame and that is arranged to be coupled to rotate with a rotary drive tool;
- means for coupling a second end of the secondary shaft in rotation with the outlet shaft; and
- means for activating coupling means that are arranged to prevent the secondary shaft being coupled in rotation with the outlet shaft only when the complementary connector is connected to the connector secured to the frame.

The secondary drive unit is thus arranged so as to enable an operator to use a rotary drive tool to actuate it without any need to power the motor of the actuator and without any risk for the operator manipulating the tool.

BRIEF DESCRIPTION OF THE DRAWINGS

Reference is made to the accompanying drawings, in which:

FIG. 5 is a fragmentary view of the actuator in section on a line V-V shown in FIG. 4;

FIG. 6 is a view analogous to FIG. 4, a tool being engaged on the secondary drive unit;

FIG. 7 is a fragmentary view of the actuator in section on a line VII-VII shown in FIG. 6.

DETAILED DESCRIPTION OF THE PREFERRED EMBODIMENTS

Figure 1:
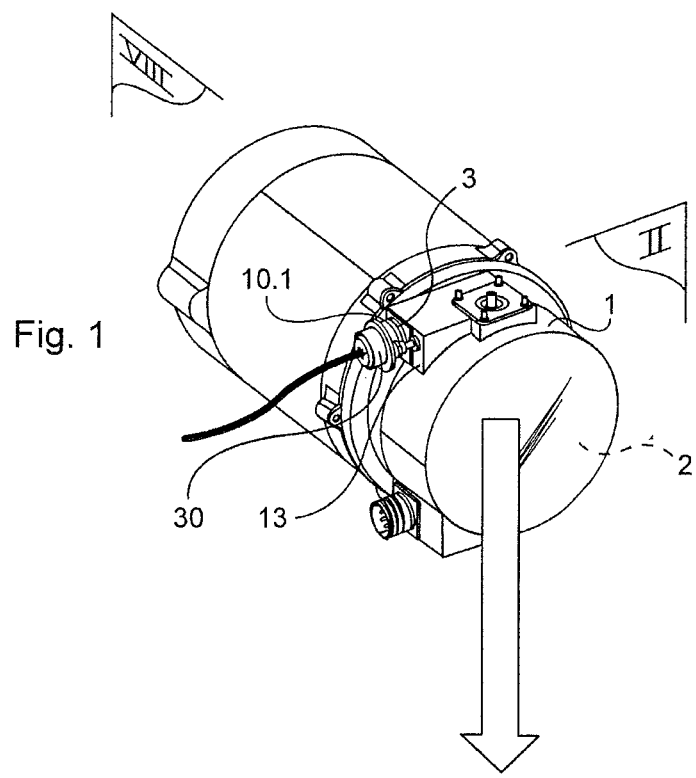
FIG. 1 is a perspective view of an actuator of the invention, said actuator being connected to an electrical power supply.

The invention is described herein in application to providing motor drive for a flight control surface of an aircraft.

The actuator comprises a frame or housing 1 containing both an electric motor 2 and also a secondary drive unit for moving the movable flight control surface electrically or manually.

The motor 2 is provided with a connector 3 for connecting electric motor 2 to an electrical power supply network of the aircraft. In this example, the connector 3 opens out into a face 13 of the housing 1. More precisely, the connector 3 is fastened to the housing 1 in order to project from the face 13.

The actuator has an outlet shaft 4 that is rotatably connected to the rotor of the motor 2 and that has a first end connected to a gearbox given overall reference 200, with an outlet 201 leading to the outside of the housing 1 so as to be connected, in conventional manner, to the movable flight control surface (which surface does not form part of the invention and is not shown in the figures). At its opposite end, the outlet shaft has a second end inside the housing 1 with a toothed ring 5 fastened thereto.

More precisely, the first end of the shaft 4 is connected to the inlet 202 of the gearbox 200 by a torque limiter given overall reference 300. The torque limiter is itself known and in this example it includes an external ring 301 that is secured to the first end and that surrounds a plate 302 secured to the inlet 202 of the gearbox. The plate 302 carries rollers 303 that are resiliently urged towards a radially projecting position in which they can transmit torque between the outer ring 301 and the plate 302. A brake may be associated with the actuator and/or with the movable flight control surface in order to prevent any return movement under load when the operator actuates the secondary drive unit. In this example, the brake is a friction brake given overall reference 400, and it comprises a lining-carrier plate 401 that is constrained to rotate with the plate 302 and that extends between a stationary portion of the housing 1 and an axially movable jaw 402. Springs 403 urge the jaw 402 against the lining-carrier plate 401, which is clamped against the stationary portion of the housing; and a solenoid attracts the jaw 402 against the springs 403. The brake is arranged to be active in the absence of a power supply to the actuator.

The secondary drive unit comprises a secondary shaft 6 having a first end provided with an interface 7 for engaging a tool, and a second end that has a bevel gear 8 fastened thereto. In this example, the interface 7 is a square socket of the ⅜" type. Other types of interface are usable, such as a hexagonal socket or a male portion that is not circularly symmetrical so as to be capable of cooperating with a socket tool. The bevel gear 8 has teeth arranged to co-operate with the teeth of the toothed ring 5. The interface 7 extends outside the housing 1 and the bevel gear 8 extends inside the housing 1.

The secondary shaft 6 is mounted on the housing 1 to pivot about its central axis. More precisely, the secondary shaft 6 is mounted to pivot in a bearing 11 that is mounted in the housing 1 to slide along the central axis between a first position in which the bevel gear 8 is disengaged from the toothed ring 5 (FIGS. 2, 4, 5) and a second position in which the bevel gear 8 meshes with the toothed ring 5 (FIGS. 6, 7). The secondary shaft 6 is urged into its first position by a resilient element, in this example a compression spring 9 surrounding the secondary shaft 6 and bearing against a surface of the housing 1 and a shoulder of the bearing 11.

Figure 2:
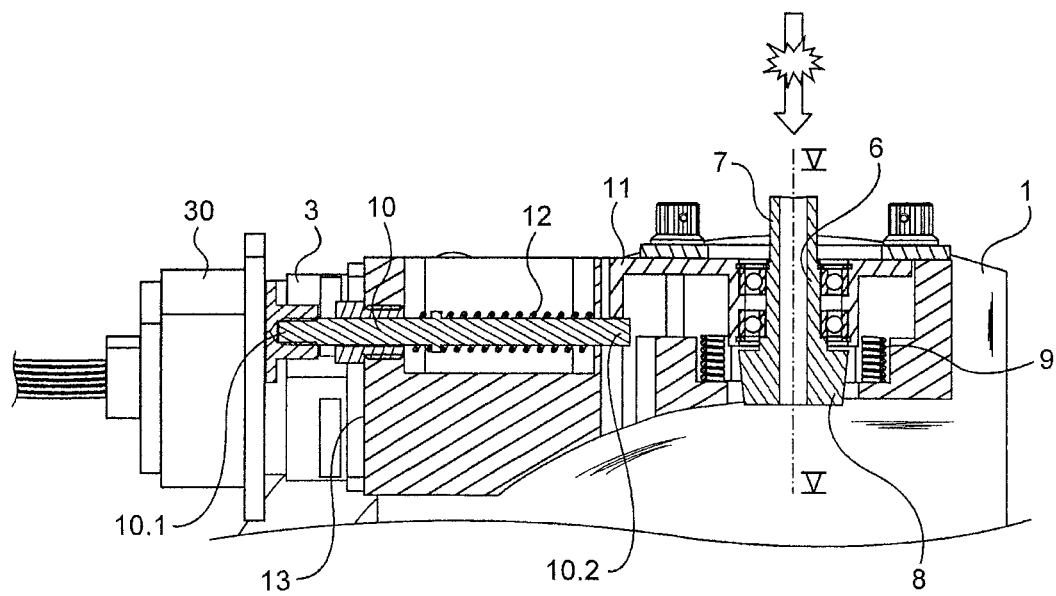
FIG. 2 is a fragmentary view of the actuator in section on a plane II of FIG. 1.
Figure 4:
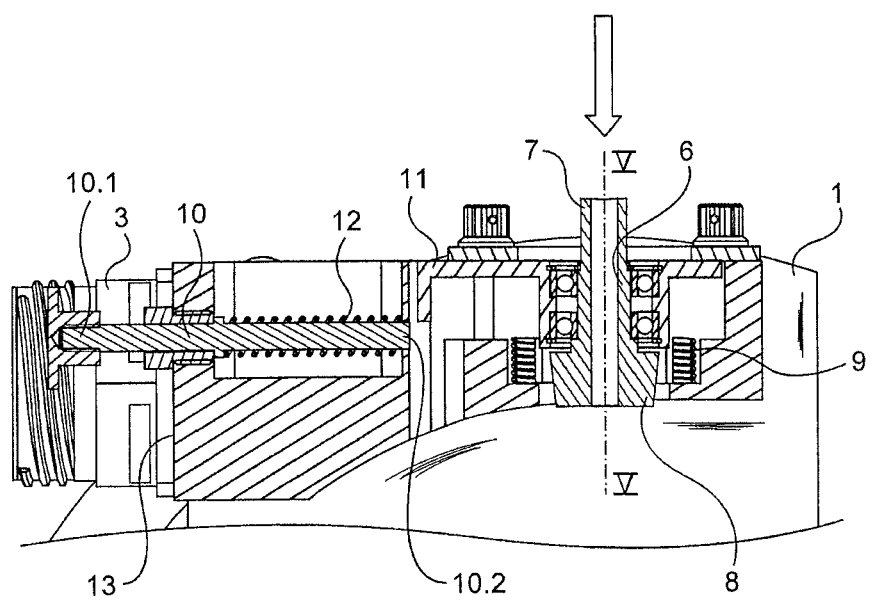
FIG. 4 is a fragmentary view of the actuator in section on a plane IV of FIG. 3, before a tool is engaged on the secondary drive unit.
Figure 8:
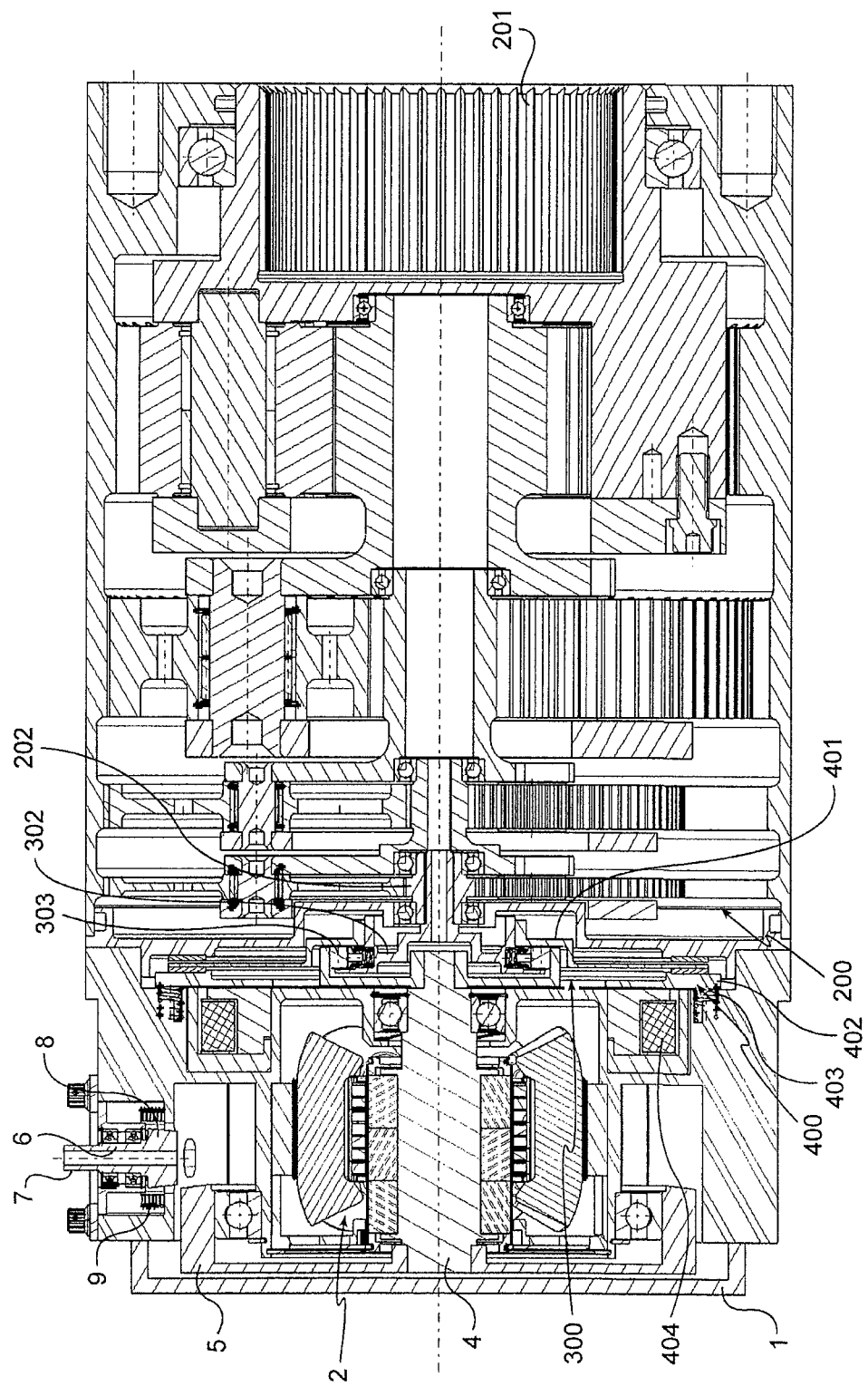
FIG. 8 is a view of the actuator in section on a plane VIII of FIG. 1.

A rod 10 is mounted in the housing 1 to slide between a first position and a second position in a direction for engaging a connector 30 with the connector 3, the connector 30 being complementary to the connector 3. In the first position, the rod 10 has a first end 10.1 projecting from the face 13 in the vicinity of the connector 3, and a second end 10.2 spaced apart from a shoulder of the bearing 11 (FIG. 4). In the second position, the rod 10 is pushed in so that the second end 10.2 of the rod 10 projects under the shoulder of the bearing 11 (FIG. 2). Thus, in its first position, the rod 10 leaves the bearing 11, and thus leaves the secondary shaft 6, free to slide between its two positions, while the rod 10 in its second position opposes sliding of the bearing 11 towards the second position of the secondary shaft 6. The rod 10 is urged towards its first position by a resilient element, in this example a compression spring 12 extending around the rod 10 between a shoulder of the rod 10 and a surface of the housing 1.

It should be understood that the rod 10 is in its first position when there is no complementary connector 30 connected to the connector 3, and it is taken towards its second position by the complementary connector 30, which bears against the first end 10.1 of the rod 10 when the complementary connector 30 is connected to the connector 3. When the secondary shaft 6 is in its second position, the shoulder of the bearing 11 prevents the rod 10 from sliding towards its second position, such that the rod 10 prevents a complementary connector being connected to the connector 3.

The operation of the invention is described below.

In normal operation, the complementary connector 30 is connected to the connector 3 of the actuator, as shown in FIGS. 1 and 2. The rod 10 is thus held in its second position, and the secondary shaft 6 is held in its first position.

Figure 3:
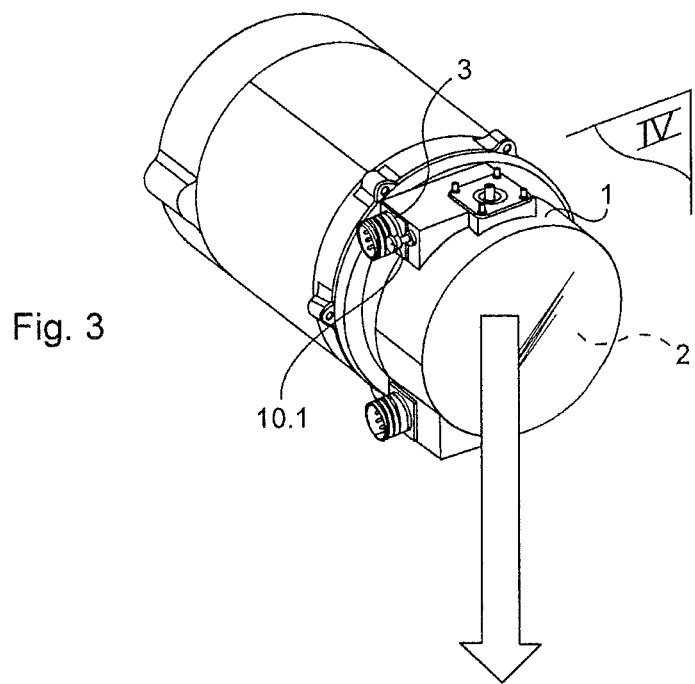
FIG. 3 is a perspective view of the actuator of the invention, the actuator being disconnected from the electrical power supply.

In order to perform a maintenance operation, the operator disconnects the complementary connector 30 from the connector 3, and the rod 10 is returned towards its first position by the compression spring 12 (as shown in FIGS. 3 and 4).

The operator then engages a cordless power tool of the screw gun type (shown symbolically at 40 in FIG. 6) on the interface 7 and pushes on the tool so as to move the secondary shaft 6 from its first position (FIG. 5) to its second position (FIGS. 6 and 7). The secondary shaft 6 is then connected to the outlet shaft 4 via the gear 8 and the toothed ring 5 (as shown in FIG. 7), such that rotation of the secondary shaft 6 produces rotation of the outlet shaft 4. If the operator needs to move the movable flight control surface until it comes into contact against a stationary abutment of the aircraft, the operator can detect that the movable control surface has come into abutment because the torque increases at that moment.

When the operator removes the tool, the secondary shaft 6 returns towards its first position under the effect of the compression spring 9.

This solution makes it possible to:
- prevent undesired rotation of the motor 2 (thereby reducing any risk for the operator); and
- avoid any risk of contact between the gear 8 of the secondary drive unit and the toothed ring 5 being driven by the motor 2 while the motor 2 of the actuator is operating normally (thus making it possible to avoid dimensioning the components of the secondary drive unit to enable them also to withstand the stresses that are associated with normal operation of the actuator).

When the brake is locked, the brake exerts sufficient force to keep the movable flight control surface in position, e.g. by opposing the action of gravity, while still enabling the operator to move the movable flight control surface if so desired by using the secondary drive unit (i.e. without needing to power the motor 2 of the actuator). The torque exerted by the movable flight control surface (because of its weight) is less than the opposing torque generated by the brake (by friction), which is less than the torque generated by the secondary drive unit. This improves safety by minimizing risks for the operator and for the mechanism of the actuator.

Preferably, the secondary drive unit includes a torque limiter in order to limit the risk of damage to the movable flight control surface or to the actuator as a result of excessive torque being transmitted via the secondary drive unit.

By way of example, the gear ratios are determined so as to comply with time constraints. Using the secondary drive unit with a tool rotating at 750 revolutions per minute (rpm) enables the movable flight control surface to be moved from one of its positions to the other (for a stroke of about 90°, e.g. 86°) in not more than 10 minutes (min), while exerting a maximum torque of less than 1 newton-meter (Nm). By way of example, the total transmission ratio between the movable flight control surface and the interface 7 may be about 28,400.

By way of example, the maximum torque may be equal to 0.71 newtons (N) (i.e. 6.3 inch-pounds (in.lbs)), and is made up as follows:
- the torque needed for moving the movable flight control surface, i.e. 0.02 Nm at the interface 7 corresponding to 476.71 Nm at the movable flight control surface; and
- the torque needed to overcome the opposing torque from the brake, i.e. 0.69 Nm at the interface 7 and 18,482.5 Nm at the movable flight control surface.

When the movable flight control surface comes into abutment, the torque limiter limits the torque that can be transmitted to the movable flight control surface by the operator via the secondary drive unit. The opposing torque generated by the torque limiter is 1.18 Nm and the torque transmitted to the movable flight control surface via the secondary drive unit is 12,734.92 Nm.

The following table results from an analysis of the various errors of manipulation made by a maintenance operator and the consequences for the actuator of the invention.

| Error of manipulation | Consequence |
| --- | --- |
| The operator does not disconnect the power supply before attempting to use the secondary drive device. | The secondary drive device cannot be rotatably connected with the motor. |

| Error of manipulation | Consequence |
| --- | --- |
| The operator stops the tool before the movable flight control surface has reached one of its abutments. | The brake holds the movable flight control surface in said position without the movable flight control surface exerting return torque on the actuator. |
| The tool is not stopped when the movable flight control surface comes into abutment. | The torque limiter limits the torque transmitted to the movable flight control surface to a value that is acceptable. |
| The operator does not decouple the tool after moving the movable flight control surface. | The return springs cannot return the secondary shaft 6 and the rod 10 to their first positions, such that the complementary connector cannot be connected to the connector 3. |

Naturally, the invention is not limited to the embodiment described but covers any variant coming within the ambit of the invention as defined by the claims.

The actuator may include a brake and a torque limiter in order to avoid damaging the surface when the operator brings it into abutment without reducing the speed of rotation of the maintenance tool. Nevertheless, this is optional.

The invention claimed is:

1. An actuator comprising a frame, an electric motor that is fastened to the frame and has a rotor that is constrained to rotate with an outlet shaft, and a connector that is electrically connected to the motor and that is secured to the frame in order to be connected to a complementary connector, the actuator includes a secondary drive device comprising:

a secondary shaft having a first end that extends outside the frame and that is arranged to be coupled to rotate with a rotary drive tool;

coupling mechanism for coupling a second end of the secondary shaft in rotation with the outlet shaft; and activation mechanism for activating the coupling mechanism, activation mechanism that includes an activation rod opening out into the connector secured to the frame and that is arranged to prevent the secondary shaft being coupled in rotation with the outlet shaft only when the complementary connector is connected to the connector secured to the frame.

2. An actuator according to claim 1, wherein the coupling mechanism comprises a first element secured to the second end of the secondary shaft and a second element connected to rotate with the outlet shaft, the secondary shaft being mounted to slide in a first sliding direction between a first position in which the two elements are disengaged from each other and a second position in which the two elements are coupled to rotate with each other, a resilient member urging the secondary shaft into its first position.

3. An actuator according to claim 2, wherein the activation rod is mounted to slide along a second sliding direction substantially perpendicular to the first sliding direction between a first position in which the rod has a first end projecting in the vicinity of the connector secured to the frame and a second end disengaged from the coupling mechanism, and a second position in which, the activation rod is pushed in relative to the frame and the second end projects between the elements in order to prevent them being coupled together.

4. An actuator according to claim 1, including a brake to hold the outlet shaft in position in the absence of power supply to the motor.

5. An actuator according to claim 1, including a torque limiter to avoid damaging a control surface when an operator brings said control surface into abutment without reducing a speed of rotation of a maintenance tool.

* * * * *